US012242474B1

(12) United States Patent
James et al.

(10) Patent No.: US 12,242,474 B1
(45) Date of Patent: Mar. 4, 2025

(54) LANGUAGE CONVERSION SYSTEM

(71) Applicant: Splunk Inc., San Francisco, CA (US)

(72) Inventors: Alexander D. James, Sammamish, WA (US); Ankur Dalsukhbhai Bambharoliya, Bellevue, WA (US); Venkatasubramanian Jayaraman, Issaquah, WA (US); Andrew John Peters, Sammamish, WA (US); Salih Ammar Wajih Zainulabdeen, Seattle, WA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 18/162,667

(22) Filed: Jan. 31, 2023

(51) Int. Cl.
*G06F 16/24* (2019.01)
*G06F 16/242* (2019.01)
*G06F 16/2452* (2019.01)

(52) U.S. Cl.
CPC .... *G06F 16/24526* (2019.01); *G06F 16/2433* (2019.01)

(58) Field of Classification Search
CPC ................................. G06F 16/24526
USPC ....................................... 707/713
See application file for complete search history.

(56) References Cited

U.S. PATENT DOCUMENTS

| 7,937,344 | B2 | 5/2011 | Baum et al. |
| 8,112,425 | B2 | 2/2012 | Baum et al. |
| 8,751,529 | B2 | 6/2014 | Zhang et al. |
| 8,788,525 | B2 | 7/2014 | Neels et al. |
| 9,215,240 | B2 | 12/2015 | Merza et al. |
| 9,286,413 | B1 | 3/2016 | Coates et al. |
| 10,127,258 | B2 | 11/2018 | Lamas et al. |
| 2018/0181613 | A1* | 6/2018 | Acharya ............... G06F 16/243 |
| 2019/0098106 | A1 | 3/2019 | Mungel et al. |
| 2021/0117412 | A1* | 4/2021 | Tiyyagura ........... G06F 16/2425 |
| 2022/0358125 | A1* | 11/2022 | Scholak ............ G06F 16/24522 |

FOREIGN PATENT DOCUMENTS

| CN | 101561817 A | * | 10/2009 |
| KR | 20220111020 A | * | 8/2022 |

OTHER PUBLICATIONS

Splunk Enterprise 8.0.0 Overview, available online, retrieved May 20, 2020 from docs.splunk.com.
Splunk Cloud 8.0.2004 User Manual, available online, retrieved May 20, 2020 from docs.splunk.com.

(Continued)

*Primary Examiner* — Syling Yen
(74) *Attorney, Agent, or Firm* — Shook, Hardy & Bacon L.L.P.

(57) ABSTRACT

Systems and methods are described for a query conversion system to convert a first query string from a first version of a query language to a second version of the query language. The query conversion system may be associated with a tokenizer and parser, code converter, compatibility library, and a query formatter. The tokenizer and parser may tokenize and parse a query string to create a first node tree with commands. The code converter may parse the first node tree while using the compatibility library to convert the commands and generate a second node tree. The query formatter may create a second query string executable by the second version of the query language.

20 Claims, 8 Drawing Sheets

(56) References Cited

OTHER PUBLICATIONS

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

SLAML 10 Reports, Workshop On Managing Systems via Log Analysis and Machine Learning Techniques, ;login: Feb. 2011 Conference Reports.

* cited by examiner

400

```
┌─────────────────────────────────────────────────┐
│    RECEIVE INPUT QUERY STRING IN FIRST LANGUAGE │
│                       402                       │
└─────────────────────────────────────────────────┘
                        │
                        ▼
┌─────────────────────────────────────────────────┐
│  GENERATE FIRST NODE TREE ASSOCIATED WITH       │
│  COMMANDS OF FIRST LANGUAGE VIA TOKENIZING      │
│  AND PARSING                                    │
│                       404                       │
└─────────────────────────────────────────────────┘
                        │
                        ▼
┌─────────────────────────────────────────────────┐
│  CONVERT COMMANDS IN FIRST NODE TREE TO SECOND  │
│  LANGUAGE COMMANDS WHILE IDENTIFYING            │
│  UNCONVERTABLE COMMANDS, IF ANY                 │
│                       406                       │
└─────────────────────────────────────────────────┘
                        │
                        ▼
┌─────────────────────────────────────────────────┐
│  GENERATE OUTPUT QUERY STRING WITH CONVERTED    │
│  COMMANDS AND OPTIONALLY EMBED IDENTIFIED       │
│  UNCONVERTABLE COMMANDS                         │
│                       408                       │
└─────────────────────────────────────────────────┘
```

FIG. 4

LANGUAGE CONVERSION SYSTEM

RELATED APPLICATIONS

Any and all applications for which a foreign or domestic priority claim is identified in the Application Data Sheet as filed with the present application are incorporated by reference under 37 CFR 1.57 and made a part of this specification.

BRIEF DESCRIPTION OF THE DRAWINGS

Illustrative examples are described in detail below with reference to the following figures:

FIG. 4 is a flowchart illustrating an example routine 400 for converting a query string in a first version of a query language to a query string in a second version of the query language.

DETAILED DESCRIPTION

Figure 8:
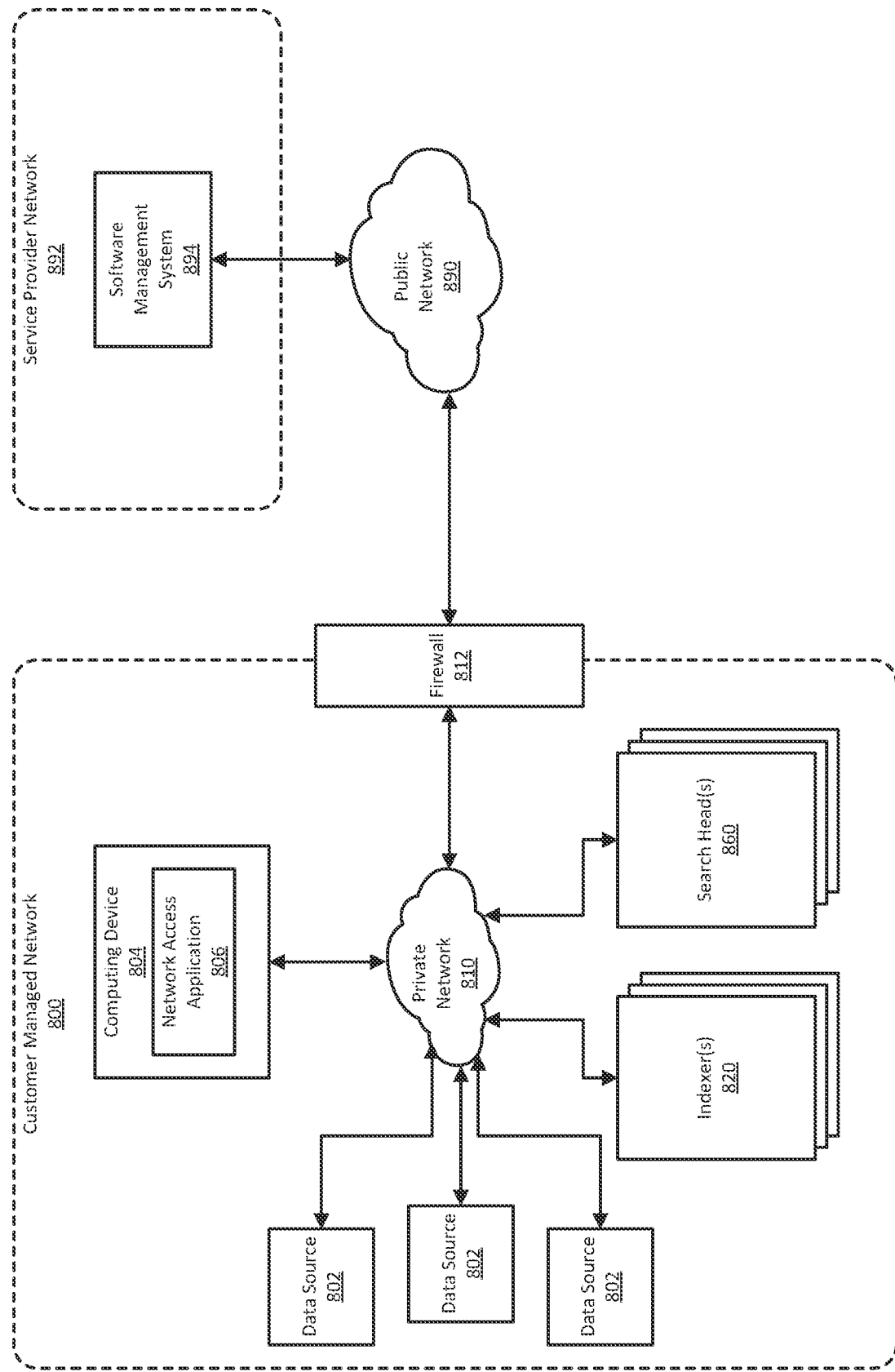
FIG. 8 illustrates an example of a self-managed network that includes a data intake and query system.

FIG. 8 illustrates an example of a self-managed network that includes a data intake and query system.

Generally described, aspects of the present disclosure relate to conversion of a query string in a first version of a query language to a second version of the query language. As used herein, a query language is a language for the specification of procedures, functions, commands, or the like, for the retrieval (and sometimes also modification) of information and/or data at least from their source (e.g., relational database, datasets of big data, organized collection of data in a datastore, etc.). Often, a given query language is not static, but may be changed over time. For example, a new version of a query language may be developed that has support for new commands and/or operations in the new version (e.g., allowing functionality not supported prior), but lack support for certain commands and/or operations of an older version (e.g., incompatibility with the new version). As such, while different versions of a query language can be expected to often support much of the same functionality, a newer version of the query language can often introduce new features or functionality that is not supported by a prior version of the query language. Moreover, some features or functionality in a prior version of a query language may be modified, deprecated or removed from a subsequent version such that a command in the prior version of the query language is not directly implementable as a command in the second version of the query language. This can cause incompatibilities when different components within a system support different versions of the query language. For example, a client device may be configured to submit queries in a first version of the query language, while a server device may be configured to accept queries in a second version of the query language. Incompatibilities between such versions can result in failure of operation of the client, server, or both. Embodiments of the present application provide for conversion of queries between different versions of a query language to avoid such incompatibilities.

One mechanism for addressing incompatibilities between query language versions is to provide for direct conversion of commands in a first version to commands in a second version. However, such direct conversion may only be possible where all commands exist in both versions—should a query include commands from the first version that are not natively supported in the second version, conversion may fail. An alternative mechanism is to provide backwards compatibility to prior versions of a query language. For example, software may be configured to accept commands both in a new version of a query language and in one or more past versions as a backward compatible command. However, this approach can detrimentally fail to utilize native commands of a new version of the query language. Native commands may be preferable to backward compatible commands from prior versions of a query language because the newer version of the query language may have been created to have the best performance with its native commands. For example, more computer processing may be required to execute a backward compatibility command versus a similar native command. In turn, more memory and longer execution time may result from substantial use of backward compatible commands.

Embodiments of the present disclosure address this problem by providing for a hybrid approach to converting old commands to new commands, in addition to native command support and supporting commands of a non-current version for backward compatibility (which commands are generally referred to as "backward compatibility commands"). Specifically, as disclosed herein, a query conversion system may support a compatibility library which may be utilized by the query conversion system to act as a middle ground between backward compatible commands and native commands. To at least address lack of support for a non-natively supported command (which may otherwise require backward compatibility), the query conversion system may add a new command to the compatibility library which may be implemented as a function in a new version of a query language. This function may implement functionality of a command of an older version by using native commands in the new version. Because execution of native commands may be preferable to executing backward compatibility commands, utilizing native commands to provide functionality for a command of an older version of the query language (without native support) may be preferable to running the backward compatible command. The result is that the query conversion system can provide superior execution performance relative to other techniques.

As disclosed herein, a query conversion system can be configured to convert queries in a first version of a query language to queries in a second version of the query language. In one embodiment, the query conversion system utilizes a tokenizer and parser to create a first node tree. The tokenizer and parser may take the query string and identify what words in the query string are commands. For example, the tokenizer and parser may take the query string "tstats count by host|eval x=10|fillnull value="unknown"" and identify the commands of "tstats," "eval," and "fillnull." The tokenizer and parser may then take every command identified (e.g., "tstats," "eval," and "fillnull.") and create a node tree (e.g., abstract syntax tree (AST)) where each node of the tree may be assigned to one command (e.g., a node is assigned to the command "tstats"). The result is a node tree which may contain all the commands from the query string.

The query conversion system may receive a first node tree and utilize a code converter to convert commands in each node of the first node tree to a second version of the query language in a node of a second node tree. The code converter may assign each node of the second node tree by using one of three conversions. Specifically, the code converter may first evaluate if a native command of the second version fully supports a command in the first version; if so, the code converter may convert the command of the first version to the native command of the second version. If there is no native support, the code converter may then evaluate if the command of the first version is fully supported by a function in the compatibility library, if so, that command may be converted to the function of the compatibility library. Additionally, if there is no native support and no function of the compatibility library that fully supports the command of the first version, then the command of the first version may be embedded as a command of the first version.

After the second node tree has been created by the query converter, the query conversion system may use a query formatter to generate a second query string. The query formatter may receive the second node tree and parse it to retrieve the commands within each node. The query formatter may then generate the second query string in a format which may be executed in the second query language without modification and/or error.

As will be appreciated by one of skill in the art in light of the present disclosure, the embodiments disclosed herein improve the ability of computing systems, query command conversion systems. Moreover, the presently disclosed embodiments address technical problems arising due to executing different versions of query languages (e.g., trying to execute a query in a newer version of a language with commands no longer supported). These technical problems are addressed by the various technical solutions described herein, including the use of a code converter to generate queries in a second version of a language from queries in a first version of a language, while modifying individual commands within the query according to compatibility with the second version. Thus, the present disclosure represents an improvement in conversion systems and computing systems in general.

It should be noted that the disclosed embodiments are also applicable to other languages, such as coding like Java and Python. Therefore, such embodiments are not limited to query languages. For example, similar to the disclosed embodiments as related to query languages, the query conversion system could also convert a first coding string (e.g., in a first version of a coding language) to a second coding string (e.g., in a second version of the coding language). In this example, the query conversion system may receive the first coding string and utilize a tokenizer and parser to parse every coding command in the first coding string and create a first node tree with a node assigned to every coding command. The query conversion system may then use a code converter to convert every coding command in the first node tree to a compatible coding command in the second version of the coding language resulting in one of three outcomes. If a coding command is natively supported in the second version of the coding language, it will be converted to that native coding command in the second version of the coding language. If a coding command is not natively supported, but is supported by a function of a compatibility library (with the features of the compatibility library discussed at least in reference to query string conversions), the coding command may be converted to a function of the compatibility library. If a coding command is neither converted to a native coding command of the second version of the coding language nor a function of the compatibility library, the query conversion system may then embed the coding command to be executed in the second version (as a coding command in the first version of the coding language). The converted commands may then be used to generate a second node tree with every node assigned to a converted coding command by the code converter. The query conversion system may then utilize a formatter to format the second coding string with commands from the second node tree in order for the second coding string to be executed in the second version of the coding language without error.

The foregoing aspects and many of the attendant advantages of this disclosure will become more readily appreciated as the same become better understood by reference to the following description, when taken in conjunction with the accompanying drawings.

Figure 1:
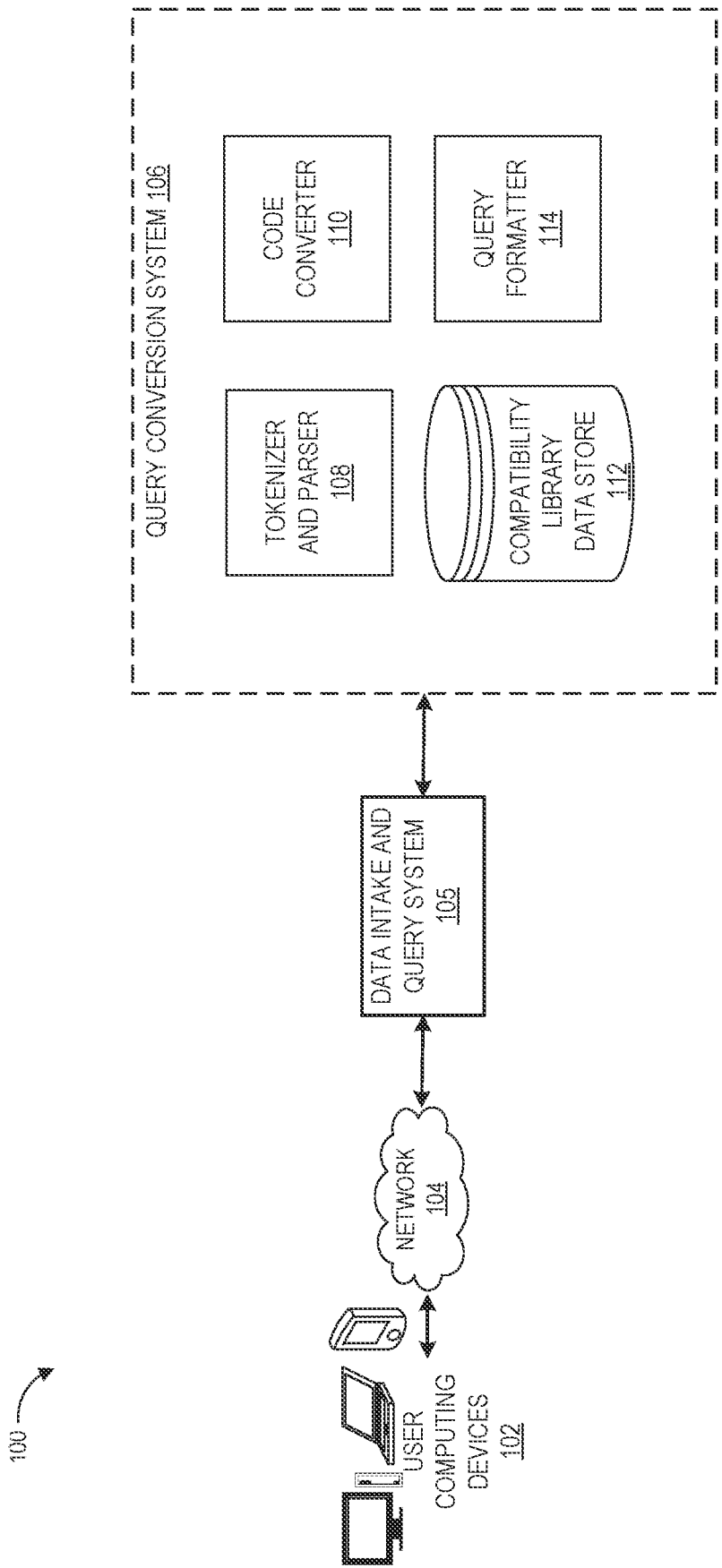
FIG. 1 is a block diagram of an example environment in which a query conversion system may be implemented.

FIG. 1 illustrates an example of a computing system 100 in which aspects of the present disclosure can be implemented. In FIG. 1, system 100 illustratively implements a query conversion system 106 configured to convert a query string (also referred to as "first query string") from a first version of a query language (also referred to herein as "first version") to a query string (also referred to as "second query string") in a second version of the query language (also referred to herein as "second version"). A data intake and query system 105 may provide access to the query conversion system 106 (e.g., by providing a user interface (UI)). A user of the query conversion system 106 may use user computing devices 102 via a network 104 (e.g., the Internet) to access the data intake and query system 105, in order to use the query conversion system 106

The network 104 can include any appropriate network, including an intranet, the Internet, a cellular network, a local area network or any other such network or combination thereof. Protocols and components for communicating via the network 104 or any of the other aforementioned types of communication networks are known to those skilled in the art of computer communications and thus, need not be described in more detail herein.

The user computing devices 102 can include any network-equipped computing device, for example desktop computers, laptops, smartphones, tablets, e-readers, gaming consoles, and the like. Users can access the data intake and query system 105 via the network 104 to view or manage their data and computing resources, as well as to use websites and/or applications hosted by the data intake and query system 105.

The data intake and query system 105 of FIG. 1 may represent a simplified example of a general data intake and query system, such as the data intake and query systems described below with reference to FIGS. 5-8. Accordingly, it should be understood that embodiments described with reference to FIG. 1 may additionally or alternatively be implemented on the data intake and query systems described below. For example, the embodiments described with reference to FIG. 1 may additionally or alternatively be implemented on the data intake and query system of FIG. 5.

In FIG. 1, the query conversion system 106 may illustratively contain, but is not limited to, a tokenizer and parser 108, a code converter 110, a compatibility library data store 112, and a query formatter 114. The query conversion system 106 may utilize these system components to convert a first query string in a certain version of a query language (e.g., version 1.0) to another version of the query language (e.g., updated version 1.2). The query string conversion may result in a second query string that is compatible in a second version of the query language. Moreover, the query conversion system 106 may convert commands within the first query string to a different version of the query language in the second query string. This command conversion may have one of three outcomes. As a first outcome, the query conversion system 106 may convert a command and/or operation from the first version (also referred to herein as "first command") to a native command and/or operation of the second version. As another outcome, the query conversion system 106 may convert the first command to a function of the compatibility library associated with query conversion system 106 that is supported by the second version. As yet another outcome, the query conversion system 106 may embed the first command due to lack of support in the second version, whether as native command and/or operations of the second version or as a function of the compatibility library.

The query conversion system 106 may use the tokenizer and parser 108 to tokenize and parse a query string (e.g., first query string) received from a user of the query conversion system 106, into a first node tree. The first query string may be in the first version. The tokenizer and parser 108 may tokenize the first query string by identifying each query command and/or operation within the first query and labeling each query command and/or operation as a token. The tokenizer and parser 108 may use a tool such as ANother Tool for Language Recognition (ANTLR) to tokenize each query command and/or operation within the first query string. However, it should be noted that the tokenizer and parser 108 is not limited to ANTLRs and may use any type of tokenizer.

Furthermore, the tokenizer and parser 108 may take each command from the first query string (e.g., representing a query command) and create the first node tree using those tokens. In creating the first node tree, the tokenizer and parser 108 may parse each token and assign the token to a node of the first node tree. In other words, each command and/or operation from the first query string may be assigned to a node of the first node tree. However, it is noted that the first node tree may be created in other ways (e.g., not one query command to one node). Accordingly, the tokenizer and parser 108 may produce a tokenized and parsed node tree (e.g., a first node tree) when given the first query string.

The query conversion system 106 may then use the code converter 110 to take the first node tree and create a second node tree in the second version. The code converter 110 may take a token from the first node tree and assign a node of the second node tree to at least one of three outcomes. In one outcome, the code converter 110 may assign a node of the second node tree to a native command and/or operation of the second version. In another example, the code converter 110 may assign the node of the second node tree to a function of the compatibility library. In yet another outcome, the code converter 110 may assign the node of the second node tree to an embedded command and/or operation of the first version. However, it should be noted that tree nodes of the second node tree are not limited to these node assignments.

The code converter 110 may assign the node of the second node tree to a native command and/or operation of the second version when the first command associated with a token of the first node tree has functionality equivalent to it in a native command and/or operation of the second version. The code converter 110 may determine that a native command and/or operation of the second version has all the functionality and/or options of the first command. In determining this functionality and/or options, the code converter 110 may reference a first mapping table. The first mapping table may contain one-to-one mappings of native commands and/or operations in the second version that support all the functionality and/or options of a command and/or operation of the first version. Therefore, the code converter 110 may determine that the first command is supported by a command in the second version by referencing the first mapping table (e.g., with the first command and seeing which listed native command and/or operation of the second version are mapped to it). In other words, a command of the first version may be determined to be functionally equivalent to a given native command and/or operation of the second version, by reference to the first mapping table.

Additionally, or alternatively, the code converter 110 may assign the node of the second node tree to a native command and/or operation of the second version in other ways. For example, the code converter 110 may determine that the way the first command is used in the first query involves a limited set of functionality and/or options that is fully supported in a native command and/or operation of the second version, even though all of the first command's functionality and/or operations are not supported in the native command and/or operation of the second version. In this case, the code converter 110 may still assign the node of the second node tree to a native command and/or operation of the second version because of how the first command is used in the first query string (e.g., all the functionality and/or operations of the first command referenced and/or used in the first query string are supported in the native command and/or operation of the second version).

The compatibility library may be coupled with the code converter 110 to provide functions that support commands and/or operations of the first version when those commands and/or operations are not supported as native commands and/or operations of the second version. The compatibility library data store 112 may be a data store storing code where the stored code may be a compatibility library. The compatibility library may be loaded (e.g., as a package) by the code converter 110 from the compatibility library data store 112 to implement functions associated with that compatibility library (which, in turn, are functions associated with the compatibility library). The functions of the compatibility library may use native commands of the second version to offer all the functionality and/or options of a command of the first version. Furthermore, functions of the compatibility library are compliant with the second version. In other words, these functions may be executed in the second version without issue and/or error It should be noted the compatibility library may be implemented by other ways other than through use of a package. For example, the compatibility library may be implemented via a call from the second version to an application programming interface (API) where a user of the second version can make a call to the API to import functions from the compatibility library to be used in the second version. Moreover, the compatibility library may be implemented as a built-in library that may be maintained by users of the second version and/or maintained by second version itself (e.g., administrators, programmers, and/or developers that write code to maintain (such as add new functions) the compatibility library).

As described herein, functions of the compatibility library may be created by using native commands and/or operations of the second version. Therefore, the compatibility library may enable the second version to support a hybrid back compatibility to the first version by at least using the second version's own native commands (e.g., by use of functions) and/or operations instead of, for example, injecting commands and/or operations of the first version into the second version. As an example, the "makeresults" function (e.g., native command and/or operation of the first version) of the compatibility library may be written in the second version as "export function makeresults ($count: number=1): dataset {return|from repeat ({ }, $count)}." In this conversion, the "makeresults" function may be implemented into the second version by using the second version's own native built-in command and/or operation "repeat" as used in the string "repeat ({ }, $count)}." Therefore, when a user of the second version imports the function "makeresults" into the second version, this user may use a command and/or operation of the first version (e.g., "makeresults") with natively supported functionality in the second version. This may be allowed by use of at least the compatibility library (e.g., which may use native commands of the second version to create the "makeresults" compatibility function). As stated herein, a function of the compatibility library may be preferable to an embedded command due to the performance benefits of native commands versus embedded commands that are not native.

The code converter 110 may assign the node of the second node tree to a function of the compatibility library if the first command's functionality and/or options are not supported in a native command of the second version and the function of the compatibility library has all the functionality and/or options of the first command. The code converter 110 may determine that a function of the compatibility library has all the functionality and/or options of the first command. In determining this functionality and/or options, the code converter 110 may reference a second mapping table. The second mapping table may contain one-to-one mappings of functions of the compatibility library that supports all the functionality and/or options of a command and/or operation of the first query language. Therefore, the code converter 110 may determine that the first command is supported by a function of the compatibility library by referencing the second mapping table (with the first command) and seeing which listed functions of the compatibility library are mapped to it.

Additionally, or alternatively, the code converter 110 may assign the node of the second node tree to a function of the compatibility library in other ways. For example, the code converter 110 may determine that the way the first command is used in the first query involves a limited set of functionality and/or options that is fully supported in a function of the compatibility library, even though all of the first command's functionality and/or operations are not supported in that function. In this case, the code converter 110 may still assign the node of the second node tree to a function of the compatibility library because of how the first command is used in the first query string (e.g., all the functionality and/or operations of the first command referenced in the first query string are supported in the function of the compatibility).

The code converter 110 may assign the node of the second node tree to an embedded version of the first command if the first command's functionality and/or options are not supported in a native command of the second version and not supported by a function of the compatibility library. The data intake and query system 105 that may receive and execute the second query string may be configured to accept embedded commands of the first version. In other words, if the first command cannot be converted using native commands and/or operations of the second version (e.g., via native commands of the second version or a function of the compatibility library which uses native commands of the second version), then the code converter 110 may embed or inject the first command as it is written in the first version. For example, the code converter 110 may embed the "makeresults" command of the first version by including single quotes around the query statement that uses this command and/or operation such as 'out=makeresults 10|eval x=10' where the single quotes server to embed or inject commands and/or operations of a prior version. Moreover, a node of the second node tree may be annotated to note that such node represents a command in the first version (e.g., to notate that during execution the command with backticks, 'stats', should be executed via back compatibility).

The query formatter 114 may take the second node tree created by the code converter 110 and generate the second query string in a format of the second version. The query formatter 114 may format the second query string such that the second query string may be input into the second version, without modification, and executed without errors. Therefore, the query formatter 114 produces an executable query string in the second version.

As described herein, it should be noted that query conversion system 106 may be used for conversion of any type of computer language, and not just query languages. For example, the query conversion system 106 may be used to convert versions of a coding language, such as Python or Java. As such, the commands and/or operations of a newer version of a coding language may be used to create functions that support back compatibility of an older version's command and/or operation, thereby creating a hybrid back compatibility to an older version of the coding language with the new constructs of the new version of the coding language.

Figure 2:
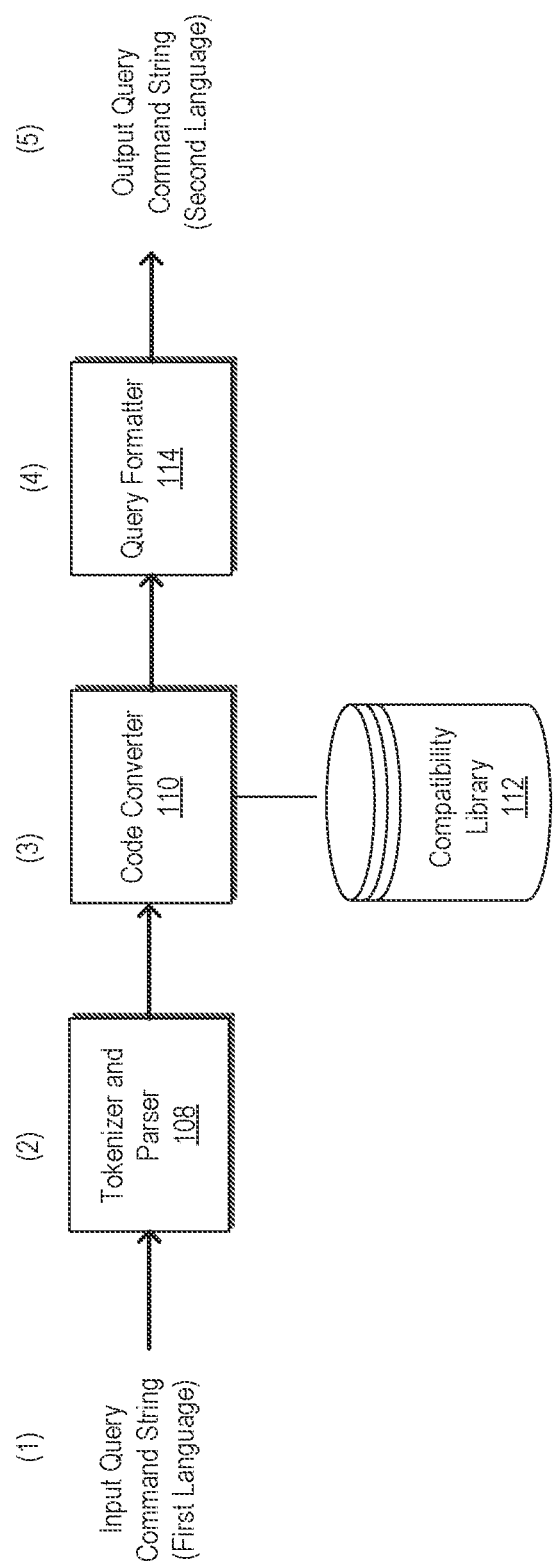
FIG. 2 is an illustrative visualization of the query conversion system of FIG. 1, used to convert a query string in a first version of a query language to a query string in a second version of the query language.

To further illustrate concepts of the query conversion system 106, FIG. 2 is an illustrative visualization of the query conversion system of FIG. 1, used to convert a query string in the first version a query string in the second. As shown in FIG. 2, the process of converting from the first query string to the second query string may be iterative such that the tokenizer and parser 108 is utilized prior to the code converter 110, and the code converter 110 is utilized prior to the query formatter 114.

At (1), the query conversion system 106 receives the first query string. For example, the query conversion system 106 may have received the first query string via the data intake and query system 105. Moreover, the data intake and query system 105 may have received the first query string from the user computing devices 102. Additionally, or alternatively, the query conversion system 106 may have received the first query string directly from the user of computing devices 102.

The first query string may contain one or more commands. These commands may perform operations such as (but are not limited to): reading information from a data set; writing information to a database; or deleting information at a certain data source. Moreover, the first query string may apply to many types of data, such as (but not limited to): data at-rest; streaming data; machine learning related data; or log data. Further, the first query string may have commands that are not supported in the second version, thus the need for the query conversion system 106.

At (2), the query conversion system 106 takes the first query string and uses the tokenizer and parser 108 to tokenize and parse the first query string into the first node tree. As described herein, the tokenizer and parser 108 may tokenize the first query string by identifying each query command and/or operation within the first query and labeling each query command and/or operation as a token. For example, the tokenizer and parser 108 may tokenize a query string "tstats count by host|eval x=10|fillnull value="unknown"" and create tokens for "tstats," "eval," and "fillnull." As discussed below, each of these tokens will be converted to a node of the second node tree.

After the tokenizer and parser 108 tokenizes each command and/or operation of the first query string to create a token, it may parse each token to create the second node tree. As described herein, the tokenizer and parser 108 may parse one token to a node of the first node tree. In other words, each command and/or operation from the first query string may be assigned to a node of the first node tree. As an example, the "makeresults" command and/or operation of the first version may be assigned to a node of the first node tree. The first node tree may then be given to and/or received by the code converter 110.

At (3), the code converter 110 takes the first node tree and creates a second node tree in the second version. As described herein, the code converter 110 may take a command from the first node tree and assign a node of the second node tree to at least one of three values. In one outcome, the code converter 110 may assign a node of the second node tree to a native command and/or operation of the second version. In another example, the code converter 110 may assign the node of the second node tree to a function of the compatibility library 112. In yet another outcome, the code converter 110 may assign the node of the second node tree to an embedded command and/or operation of the first version.

The code converter 110 may assign the node of the second node tree to a native command and/or operation of the second version when the first command associated with a token of the first node tree has functionality equivalent to it in a native command and/or operation of the second version. For example, when evaluating the individual nodes of the first node tree, the code converter 110 may determine that a node in the first node tree that contains the "eval" command and/or operation of the first version is fully supported (e.g., the second version's "eval" has all the functionality and/or options of the first version's "eval") by a native command and/or operation of the second version by the same name in the second version (e.g., "eval" in the second version).

In performing this conversion, the code converter 110 may reference the first mapping table. The first mapping table may contain one-to-one mappings of native commands and/or operations in the second version that support all the functionality and/or options of a command and/or operation of the first version. Therefore, the code converter 110 may determine that the first command is supported by a command in the second version by referencing the first mapping table (e.g., with the first command and seeing which listed native command and/or operation of the second version are mapped to it).

Additionally, or alternatively, the code converter 110 may assign the node of the second node tree to a native command and/or operation of the second version in other ways. For example, the code converter 110 may determine that the way the first command is used in the first query involves a limited set of functionality and/or options that is fully supported in a native command and/or operation of the second version, even though all of the first command's functionality and/or operations are not supported in the native command and/or operation of the second version. As such, the code converter 110 may assign a node of the second node tree the value of "eval" which may mean to process this command and/or operation in the second version as a native command and/or operation of the second version.

The code converter 110 may assign the node of the second node tree to a function of the compatibility library 112, if the first command associated with the token has functionality and/or options that are not supported in a native command of the second version and the function of the compatibility library has all the functionality and/or options of the first command. For example, when evaluating the individual nodes of the first node tree. The code converter 110 may determine that a node in the first node tree that contains the "fillnull" command and/or operation of the first version and it is not fully supported (e.g., the second version's "fillnull" does not have all the functionality and/or options of the first version's "fillnull") by a native command, or there is no command in the second version by the same name (e.g., the second version does not have "fillnull").

After determining that the "fillnull" command and/or operation of the first version is not fully supported by a command and/or operation of the second version, the code converter 110 may evaluate the first command using the compatibility library to see if "fillnull" is fully supported. In using the compatibility library 112, the code converter 110 may determine that the "fillnull" command and/or operation is fully supported by a function of the compatibility library having all the functionality and/or options of "fillnull" in the first version and is also named "fillnull" in the compatibility library. As such, the code converter 110 may assign a node of the second node tree the value of "fillnull" with a notation to execute "fillnull" using a function of the compatibility library.

Additionally, or alternatively, the code converter 110 may assign the node of the second node tree to an embedded version of the first command if the first command's functionality and/or options are not supported in a native command of the second version and also not supported by a function of the compatibility library. The code converter 110 may determine that the second version provides an ability to embed or inject the first command into the second version to be run as a command and/or operation of the first version. For example, the "tstats" command and/or function of the first version may not be fully supported as a native command and/or function of the second version, and also may not be fully supported as a function of the compatibility library. In allowing back compatibility, the query system 105 may be configured to allow the second version to accept an embedded command of the first version, for example, by wrapping the command in backticks. Therefore, the code converter 110 may assign a node of the second node tree the value of 'tstats' (with backticks) with a notation to execute 'tstats' as an embedded command and/or operation of the first version.

The code converter 110 may iterate through all the nodes of the first node tree and convert each node to a node of the second node tree by at least one of the three methods/outcomes described above. Once all the nodes of the first node tree have been converted to the second node tree. The query conversion system 106 may then provide the second node tree to the query formatter 114.

As stated herein, it may be preferable (e.g., for performance reasons) to convert the first command as a native command of the second version, instead of as a function of the compatibility library or as embedded and/or injected commands of the first version. Moreover, when the first command cannot be converted to a native command of the second version, there may be a preference to convert the first command to a function of the compatibility library instead of as embedded and/or injected commands of the first version. As described herein, native commands of the second version may be better optimized to execute on the second version (e.g., use less memory, run faster, require less compiling, etc.) than functions of the compatibility library and commands of the first version. Additionally, functions of the compatibility library may be better optimized to execute on the second version (e.g., because it may be written in native commands of the second version) than embedding and/or injecting the first command to run on the second version as a command from the first version.

At (4), the query formatter 114 may take the second node tree and create the second query string in the format of the second version. The query formatter 114 may parse through all the nodes of the second node tree and convert each node to a command and/or operation that can be executed on the second version (e.g., as a native command, function of the compatibility library, or embedded code of the first version). For example, the query formatter 114 may format the second node tree to produce the second query string as "'tstats count by host'|eval x=10|fillnull value="unknown" 'arg1*'" where the first query string was "tstats count by host|eval x=10|fillnull value="unknown"". As shown in the second query string, the 'tstats' command is wrapped in backticks because it is an embedded first version command, the "eval" command was not wrapped in backticks to indicate that the command will be used as a native "eval" in the second version, and the "fillnull" command is not wrapped in backticks and includes an extra notation 'arg1*' which may indicate "fillnull" is a function of the compatibility library.

As another example, the query formatter 114 may format the second node tree to produce the second query string as "stats count( ), sum(bytes), avg(userKB)" where the first query string was "stats count sum(bytes) avg(userKB)." As shown in the second query string of this example, the "stats count" command in the first version may be converted to the native "stats count( )" command in the second version. As shown in this example, the query formatter 114 added "( )" to the end of the "stats count" command in the second version which may be due to the second version of the "stats count" command requiring "( )" at the end of it. This formatting knowledge may have been obtained via a first version to second version command mapping table, conversion matrix, API conversion call, or the like. Therefore, the query formatter 114 may understand that while there are commands of the first version that that have a native command in the second version, the exact syntax of such command may have to be formatted to be accepted in the second version.

At (5), the query conversion system 106 may output the second query string. The second query string may be executed on the second version without any modification or changes to syntax. As described herein, the query conversion system 106 may allow optimal conversion of a query string from the first version to the second version where any and all commands will be converted, but there is a conversion preference for an optimal conversion to a native command of the second version than injecting or embedding a command from the first version.

Figure 3:
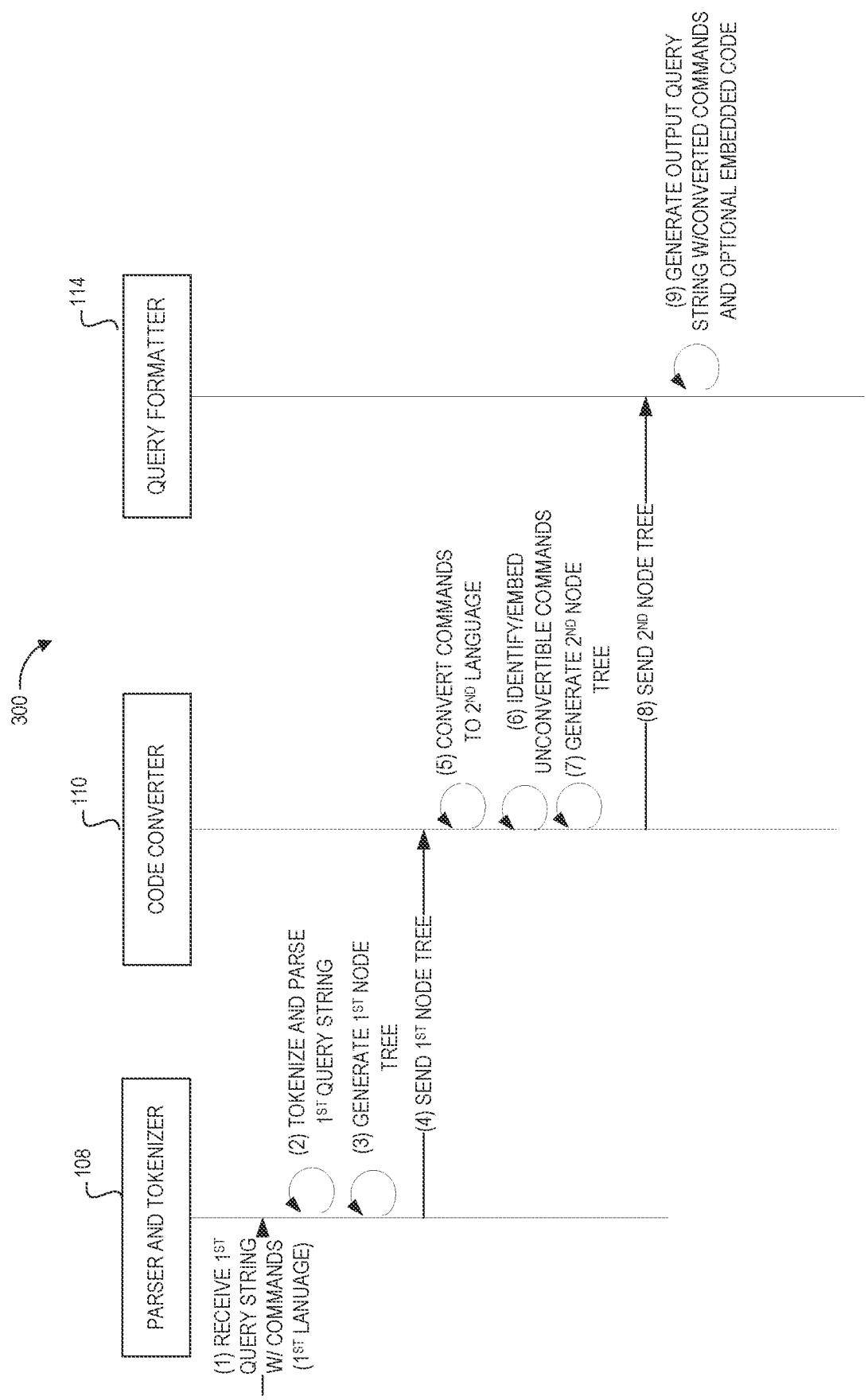
FIG. 3 depicts illustrative interactions of the various components of the query conversion system of FIG. 1 to convert a query string in a first version of a query language to a query string in a second version of the query language.

FIG. 3 depicts illustrative interactions of the various components of the query conversion system of FIG. 1 to convert a query string in the first version to the second version.

Concerning the interactions at (1), the tokenizer and parser 108 receives the first query string. The first query string may contain commands and/or operations written in the first version. For example, the tokenizer and parser 108 may have received the first query string as "tstats count by host|eval x=10|fillnull value="unknown"."

Regarding the interactions at (2), the tokenizer and parser 108 tokenizes and parses the first query string. The tokenizer and parser 108 may tokenize the first query string by identifying each query command and/or operation within the first query and labeling each query command and/or operation as a token. The tokenizer and parser 108 may then parse one token to a node of the first node tree where each command and/or operation from the first query string may be assigned to one node of the first node tree. At (3), the result of the tokenizing and parsing by the tokenizer and parser 108 may be the first node tree containing all the commands from the first query string in each of its nodes. At (4), the tokenizer and parser 108 may send the first node tree to the code converter 110.

At (5), the code converter 110 may receive the first node tree and convert nodes (commands of the first version) of the first node tree to native commands of the second version or a function of the compatibility library. If a native command of the second version has functionality equivalent to a command of the first version, the command of the first version may be converted by the code converter 110 to the native command of the second version. If not, the code converter 110 may evaluate whether a function of the compatibility library has functionality equivalent to a command of the first version, if so, the code converter 110 may convert the command of the first version to the function of the compatibility library.

At (6), the code converter 110 may identify nodes that could not be converted to a native command of the second version and could not be converted to a function of the compatibility library. For those nodes, the code converter 110 may embed the command of the first version.

At (7), the code converter 110 may generate the second node tree. In generating the second node tree, the code converter 110 may assign each node converted at (6) to a node of the second node tree. At (8), the code converter 110 may send the second node tree to the query formatter 114.

At (9), the query formatter 114 may take the second node tree create the second query string formatted in syntax that may be executed by the second version without modification. For example, the second query string may be "'tstats count by host' | eval x=10|fillnull value="unknown" 'arg1*' "where the first query string was" tstats count by host|eval x=10|fillnull value="unknown"."

FIG. 4 is a flowchart illustrating an example routine 400 for converting a query string in a first version of a query language to a query string in a second version of the query language. The routine 400 can be implemented, for example, by a computing device that comprises a processor and a non-transitory computer-readable medium. The non-transitory computer readable medium can be storing instructions that, when executed by the processor, can cause the processor to perform the operations of the illustrated routine 400. Alternatively, or additionally, the routine 400 can be implemented using a non-transitory computer-readable medium storing instructions that, when executed by one or more processors, case the one or more processors to perform the operations of the routine 400 of FIG. 4. In one example, the routine 400 is implemented by the query conversion system 106. The routine 400 can be additionally or alternatively be implemented by other elements of a distributed computing system. Further, the routine 400 may be implemented separately by multiple elements of a distributed computing system.

At block 402, the query conversion system 106 receives the first query string. As stated herein, the query conversion system 106 may receive the first query string from the data intake and query system 105 or directly from the user computing devices 102. Additionally, the query conversion system 106 may receive instructions with the first query string to convert it from the first version to the second query string in the second version.

At block 404, the query conversion system 106 may utilize the tokenizer and parser 108 to tokenize the first query string and then parse it to create the first node tree. As described herein, the tokenizer and parser 108 may tokenize each command and/or operation of the first query string to create a token and then parse each token to create the second node tree. As described herein, the tokenizer and parser 108 may parse one token to a node of the first node tree. For example, the "makeresults" command and/or operation of the first version may be assigned to a node of the first node tree.

At block 406, the query conversion system 106 may utilize the code converter 110 to convert commands in first node tree to commands that can be executed in the second version. As described herein, the code converter 110 may assign the node of the second node tree to a native command and/or operation of the second version when the first command associated with a token of the first node tree has functionality equivalent to it in a native command and/or operation of the second version. In reference to the example above, the first version's "eval" command was converted to a native "eval" command of the second version because the second version of the "eval" has functionality equivalent to the first version's "eval."

Alternatively, the code converter 110 may assign the node of the second node tree to a function of the compatibility library, if the first command associated with the token has functionality and/or options that are not supported in a native command of the second version and the function of the compatibility library data has all the functionality and/or options of the first command. In reference to the example above, the first version's "fillnull" command was converted the "fillnull" function of the compatibility library because the compatibility library function of "fillnull" has functionality equivalent to the first version's "fillnull" and there was no native support in the second version.

Moreover, the code converter 110 may assign the node of the second node tree to an embedded version of the first command if the first command's functionality and options are not supported in a native command of the second version and also not supported by a function of the compatibility library. In reference to the example above, the first version's "tstats" command may be embedded as a first version command because "tstats" is not supported in a native command of the second version and also not supported by a function of the compatibility library.

After converting all the nodes of the first node tree to compatible commands of the second version (e.g., as a native command in the second version, a function of the compatibility library, or as an embedded command, etc.) the code converter 110 may generate the second node tree. The second node tree's individual nodes may be assigned each of the converted commands from the first node tree.

As described herein, the query conversion system 106 may have a preference to convert to native commands of the second version over functions of the compatibility library and embedding first version code. If there cannot be a conversion to native commands of the first version, the query conversion system 106 may have a preference to convert to a function of the compatibility library rather than embedding commands from the first version.

At block 408, the query conversion system 106 may utilize query formatter 114 to take the second node tree and generate the second query string. In generating the second query string, the query formatter 114 may ensure that the syntax of the second query string may be executed in the second version without modification. For example, the query formatter 114 may have produced the second as "'tstats count by host'|eval x=10|fillnull value="unknown" 'arg1*'" which may be executed in the second version without modification. The routine then ends.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 5:
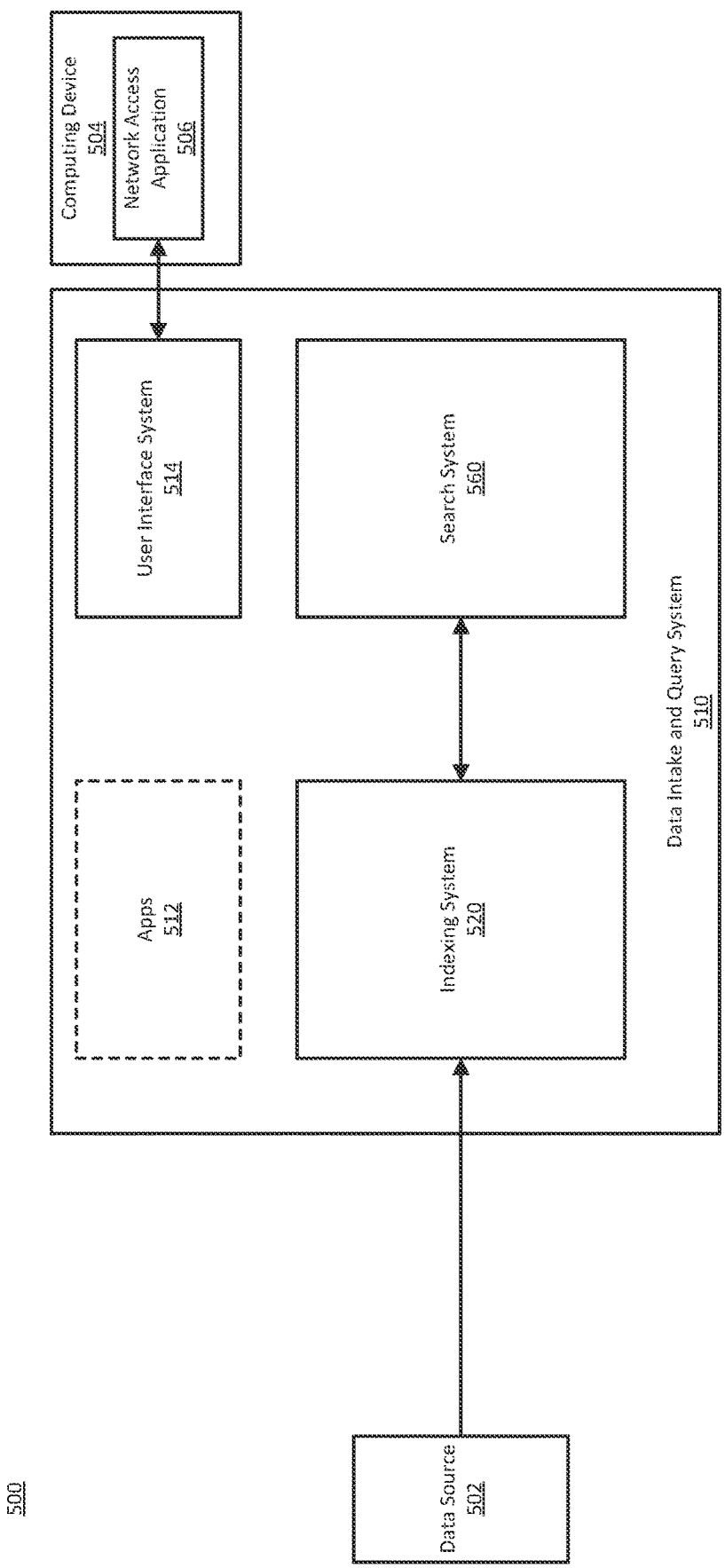
FIG. 5 is a block diagram illustrating an example computing environment that includes a data intake and query system.

FIG. 5 is a block diagram illustrating an example computing environment 500 that includes a data intake and query system 510. The data intake and query system 510 obtains data from a data source 502 in the computing environment 500, and ingests the data using an indexing system 520. A search system 560 of the data intake and query system 510 enables users to navigate the indexed data. Though drawn with separate boxes in FIG. 5, in some implementations the indexing system 520 and the search system 560 can have overlapping components. A computing device 504, running a network access application 506, can communicate with the data intake and query system 510 through a user interface system 514 of the data intake and query system 510. Using the computing device 504, a user can perform various operations with respect to the data intake and query system 510, such as administration of the data intake and query system 510, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 510 can further optionally include apps 512 that extend the search, analytics, and/or visualization capabilities of the data intake and query system 510.

The data intake and query system 510 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 510 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 510 can be executed on a single computing device, or execution of the program code can be distributed over multiple computing devices. For example, the program code can include instructions for both indexing and search components (which may be part of the indexing system 520 and/or the search system 560, respectively), which can be executed on a computing device that also provides the data source 502. As another example, the program code can be executed on one computing device, where execution of the program code provides both indexing and search components, while another copy of the program code executes on a second computing device that provides the data source 502. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 502 of the computing environment 500 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 502 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 520 obtains machine date from the data source 502 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 520 does not require prior knowledge of the structure of incoming data (e.g., the indexing system 520 does not need to be provided with a schema describing the data). Additionally, the indexing system 520 retains a copy of the data as it was received by the indexing system 520 such that the original data is always available for searching (e.g., no data is discarded, though, in some examples, the indexing system 520 can be configured to do so).

The search system 560 searches the data stored by the indexing 520 system. As discussed in greater detail below, the search system 560 enables users associated with the computing environment 500 (and possibly also other users) to navigate the data, generate reports, and visualize search results in "dashboards" output using a graphical interface. Using the facilities of the search system 560, users can obtain insights about the data, such as retrieving events from an index, calculating metrics, searching for specific conditions within a rolling time window, identifying patterns in the data, and predicting future trends, among other examples. To achieve greater efficiency, the search system 560 can apply map-reduce methods to parallelize searching of large volumes of data. Additionally, because the original data is available, the search system 560 can apply a schema to the data at search time. This allows different structures to be applied to the same data, or for the structure to be modified if or when the content of the data changes. Application of a schema at search time may be referred to herein as a late-binding schema technique.

The user interface system 514 provides mechanisms through which users associated with the computing environment 500 (and possibly others) can interact with the data intake and query system 510. These interactions can include configuration, administration, and management of the indexing system 520, initiation and/or scheduling of queries that are to be processed by the search system 560, receipt or reporting of search results, and/or visualization of search results. The user interface system 514 can include, for example, facilities to provide a command line interface or a web-based interface.

Users can access the user interface system 514 using a computing device 504 that communicates with data intake and query system 510, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 500. For example, a person can log in as a particular user and, using the user's digital information, can access the data intake and query system 510. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 504 can provide a human-machine interface through which a person can have a digital presence in the computing environment 500 in the form of a user. The computing device 504 is an electronic device having one or more processors and a memory capable of storing instructions for execution by the one or more processors. The computing device 504 can further include input/output (I/O) hardware and a network interface. Applications executed by the computing device 504 can include a network access application 506, such as a web browser, which can use a network interface of the client computing device 504 to communicate, over a network, with the user interface system 514 of the data intake and query system #A110. The user interface system 514 can use the network access application 506 to generate user interfaces that enable a user to interact with the data intake and query system #A110. A web browser is one example of a network access application. A shell tool can also be used as a network access application. In some examples, the data intake and query system 510 is an application executing on the computing device 506. In such examples, the network access application 506 can access the user interface system 514 without going over a network.

The data intake and query system 510 can optionally include apps 512. An app of the data intake and query system 510 is a collection of configurations, knowledge objects (a user-defined entity that enriches the data in the data intake and query system 510), views, and dashboards that may provide additional functionality, different techniques for searching the data, and/or additional insights into the data. The data intake and query system 510 can execute multiple applications simultaneously. Example applications include an information technology service intelligence application, which can monitor and analyze the performance and behavior of the computing environment 500, and an enterprise security application, which can include content and searches to assist security analysts in diagnosing and acting on anomalous or malicious behavior in the computing environment 500.

Though FIG. 5 illustrates only one data source, in practical implementations, the computing environment 500 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 500, the data intake and query system 510 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 500 can include on-prem and cloud-based computing resources, or only cloud-based resources. For example, an entity may have on-prem computing devices and a private cloud. In this example, the entity operates the data intake and query system 510 and can choose to execute the data intake and query system 510 on an on-prem computing device or in the cloud. In another example, a provider entity operates the data intake and query system 510 in a public cloud and provides the functionality of the data intake and query system 510 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 510. In some implementations, the entity providing the data intake and query system 510 is itself subscribing to the cloud services of a cloud service provider. As an example, a first entity provides computing resources under a public cloud service model, a second entity subscribes to the cloud services of the first provider entity and uses the cloud computing resources to operate the data intake and query system 510, and a third entity can subscribe to the services of the second provider entity in order to use the functionality of the data intake and query system 510. In this example, the data sources are associated with the third entity, users accessing the data intake and query system 510 are associated with the third entity, and the analytics and insights provided by the data intake and query system 510 are for purposes of the third entity's operations.

Figure 6:
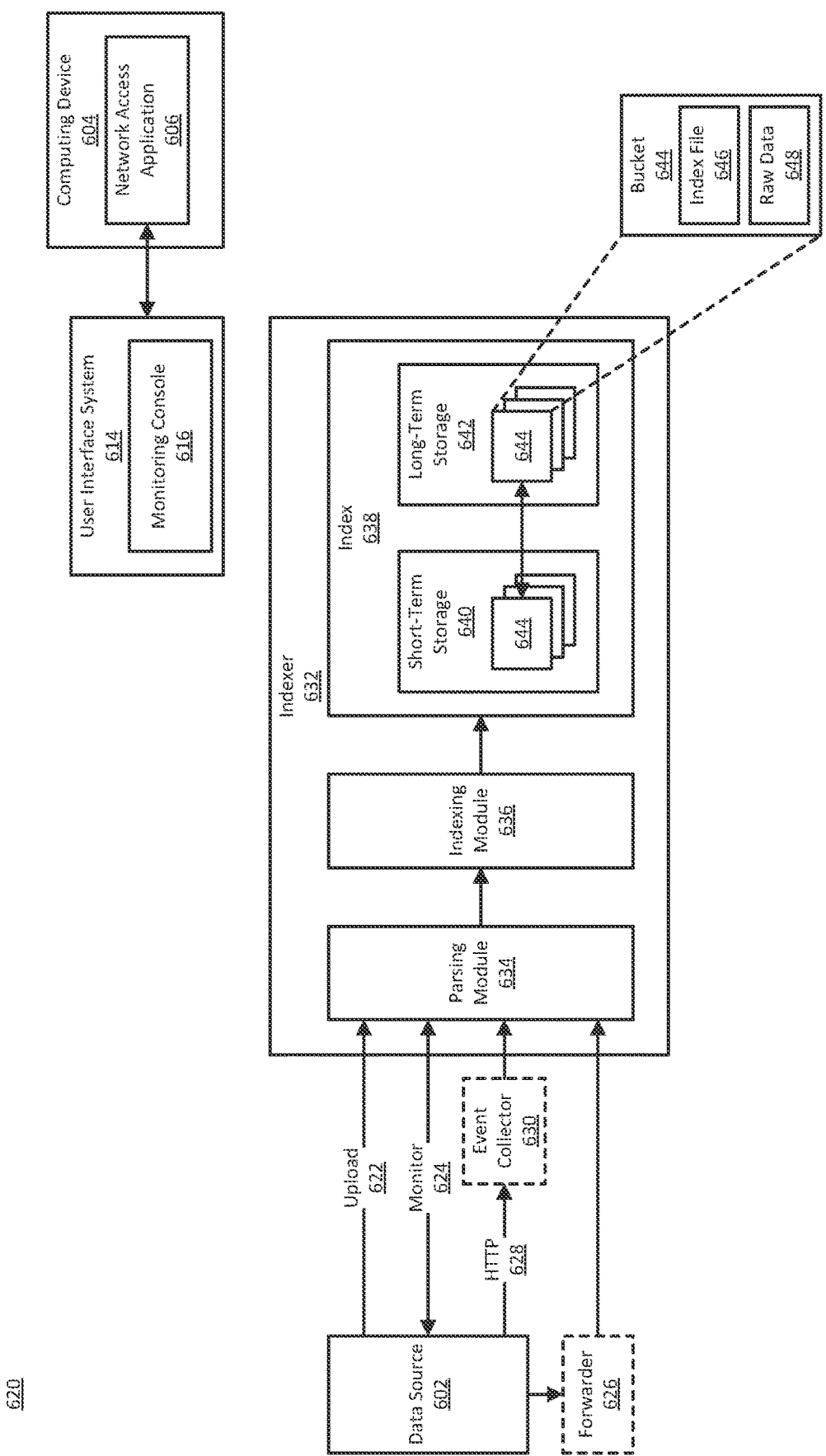
FIG. 6 is a block diagram illustrating in greater detail an example of an indexing system of a data intake and query system.

FIG. 6 is a block diagram illustrating in greater detail an example of an indexing system 620 of a data intake and query system, such as the data intake and query system 510 of FIG. 5. The indexing system 620 of FIG. 6 uses various methods to obtain machine data from a data source 602 and stores the data in an index 638 of an indexer 632. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 620 enables the data intake and query system to obtain the machine data produced by the data source 602 and to store the data for searching and retrieval.

Users can administer the operations of the indexing system 620 using a computing device 604 that can access the indexing system 620 through a user interface system 614 of the data intake and query system. For example, the computing device 604 can be executing a network access application 606, such as a web browser or a terminal, through which a user can access a monitoring console 616 provided by the user interface system 614. The monitoring console 616 can enable operations such as: identifying the data source 602 for data ingestion; configuring the indexer 632 to index the data from the data source 632; configuring a data ingestion method; configuring, deploying, and managing clusters of indexers; and viewing the topology and performance of a deployment of the data intake and query system, among other operations. The operations performed by the indexing system 620 may be referred to as "index time" operations, which are distinct from "search time" operations that are discussed further below.

The indexer 632, which may be referred to herein as a data indexing component, coordinates and performs most of the index time operations. The indexer 632 can be implemented using program code that can be executed on a computing device. The program code for the indexer 632 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 632. In some implementations, the indexer 632 executes on the computing device 604 through which a user can access the indexing system 620. In some implementations, the indexer 632 executes on a different computing device than the illustrated computing device 604.

The indexer 632 may be executing on the computing device that also provides the data source 602 or may be executing on a different computing device. In implementations wherein the indexer 632 is on the same computing device as the data source 602, the data produced by the data source 602 may be referred to as "local data." In other implementations the data source 602 is a component of a first computing device and the indexer 632 executes on a second computing device that is different from the first computing device. In these implementations, the data produced by the data source 602 may be referred to as "remote data." In some implementations, the first computing device is "on-prem" and in some implementations the first computing device is "in the cloud." In some implementations, the indexer 632 executes on a computing device in the cloud and the operations of the indexer 632 are provided as a service to entities that subscribe to the services provided by the data intake and query system.

For a given data produced by the data source 602, the indexing system 620 can be configured to use one of several methods to ingest the data into the indexer 632. These methods include upload 622, monitor 624, using a forwarder 626, or using HyperText Transfer Protocol (HTTP 628) and an event collector 630. These and other methods for data ingestion may be referred to as "getting data in" (GDI) methods.

Using the upload 622 method, a user can specify a file for uploading into the indexer 632. For example, the monitoring console 616 can include commands or an interface through which the user can specify where the file is located (e.g., on which computing device and/or in which directory of a file system) and the name of the file. The file may be located at the data source 602 or maybe on the computing device where the indexer 632 is executing. Once uploading is initiated, the indexer 632 processes the file, as discussed further below. Uploading is a manual process and occurs when instigated by a user. For automated data ingestion, the other ingestion methods are used.

The monitor 624 method enables the indexing system 602 to monitor the data source 602 and continuously or periodically obtain data produced by the data source 602 for ingestion by the indexer 632. For example, using the monitoring console 616, a user can specify a file or directory for monitoring. In this example, the indexing system 602 can execute a monitoring process that detects whenever the file or directory is modified and causes the file or directory contents to be sent to the indexer 632. As another example, a user can specify a network port for monitoring. In this example, a monitoring process can capture data received at or transmitting from the network port and cause the data to be sent to the indexer 632. In various examples, monitoring can also be configured for data sources such as operating system event logs, performance data generated by an operating system, operating system registries, operating system directory services, and other data sources.

Monitoring is available when the data source 602 is local to the indexer 632 (e.g., the data source 602 is on the computing device where the indexer 632 is executing). Other data ingestion methods, including forwarding and the event collector 630, can be used for either local or remote data sources.

A forwarder 626, which may be referred to herein as a data forwarding component, is a software process that sends data from the data source 602 to the indexer 632. The forwarder 626 can be implemented using program code that can be executed on the computer device that provides the data source 602. A user launches the program code for the forwarder 626 on the computing device that provides the data source 602. The user can further configure the forwarder 626, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 626 can provide various capabilities. For example, the forwarder 626 can send the data unprocessed or can perform minimal processing on the data before sending the data to the indexer 632. Minimal processing can include, for example, adding metadata tags to the data to identify a source, source type, and/or host, among other information, dividing the data into blocks, and/or applying a timestamp to the data. In some implementations, the forwarder 626 can break the data into individual events (event generation is discussed further below) and send the events to a receiver. Other operations that the forwarder 626 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 630 provides an alternate method for obtaining data from the data source 602. The event collector 630 enables data and application events to be sent to the indexer 632 using HTTP 628. The event collector 630 can be implemented using program code that can be executing on a computing device. The program code may be a component of the data intake and query system or can be a standalone component that can be executed independently of the data intake and query system and operates in cooperation with the data intake and query system.

To use the event collector 630, a user can, for example using the monitoring console 616 or a similar interface provided by the user interface system 614, enable the event collector 630 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 602 as an alternative method to using a username and password for authentication.

To send data to the event collector 630, the data source 602 is supplied with a token and can then send HTTP 628 requests to the event collector 630. To send HTTP 628 requests, the data source 602 can be configured to use an HTTP client and/or to use logging libraries such as those supplied by Java, JavaScript, and .NET libraries. An HTTP client enables the data source 602 to send data to the event collector 630 by supplying the data, and a Uniform Resource Identifier (URI) for the event collector 630 to the HTTP client. The HTTP client then handles establishing a connection with the event collector 630, transmitting a request containing the data, closing the connection, and receiving an acknowledgment if the event collector 630 sends one. Logging libraries enable HTTP 628 requests to the event collector 630 to be generated directly by the data source. For example, an application can include or link a logging library, and through functionality provided by the logging library manage establishing a connection with the event collector 630, transmitting a request, and receiving an acknowledgement.

An HTTP 628 request to the event collector 630 can contain a token, a channel identifier, event metadata, and/or event data. The token authenticates the request with the event collector 630. The channel identifier, if available in the indexing system 620, enables the event collector 630 to segregate and keep separate data from different data sources. The event metadata can include one or more key-value pairs that describe the data source 602 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 630 extracts events from HTTP 628 requests and sends the events to the indexer 632. The event collector 630 can further be configured to send events to one or more indexers. Extracting the events can include associating any metadata in a request with the event or events included in the request. In these implementations, event generation by the indexer 632 (discussed further below) is bypassed, and the indexer 632 moves the events directly to indexing. In some implementations, the event collector 630 extracts event data from a request and outputs the event data to the indexer 632, and the indexer generates events from the event data. In some implementations, the event collector 630 sends an acknowledgement message to the data source 602 to indicate that the event collector 630 has received a particular request form the data source 602, and/or to indicate to the data source 602 that events in the request have been added to an index.

The indexer 632 ingests incoming data and transforms the data into searchable knowledge in the form of events. In the data intake and query system, an event is a single piece of data that represents activity of the component represented in FIG. 6 by the data source 602. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 632 can include a parsing module 634 and an indexing module 636 for generating and storing the events. The parsing module 634 and indexing module 636 can be modular and pipelined, such that one component can be operating on a first set of data while the second component is simultaneously operating on a second sent of data. Additionally, the indexer 632 may at any time have multiple instances of the parsing module 634 and indexing module 636, with each set of instances configured to simultaneously operate on data from the same data source or from different data sources. The parsing module 634 and indexing module 636 are illustrated in FIG. 6 to facilitate discussion, with the understanding that implementations with other components are possible to achieve the same functionality.

The parsing module 634 determines information about incoming event data, where the information can be used to identify events within the event data. For example, the parsing module 634 can associate a source type with the event data. A source type identifies the data source 602 and describes a possible data structure of event data produced by the data source 602. For example, the source type can indicate which fields to expect in events generated at the data source 602 and the keys for the values in the fields, and possibly other information such as sizes of fields, an order of the fields, a field separator, and so on. The source type of the data source 602 can be specified when the data source 602 is configured as a source of event data. Alternatively, the parsing module 634 can determine the source type from the event data, for example from an event field in the event data or using machine learning techniques applied to the event data.

Other information that the parsing module 634 can determine includes timestamps. In some cases, an event includes a timestamp as a field, and the timestamp indicates a point in time when the action represented by the event occurred or was recorded by the data source 602 as event data. In these cases, the parsing module 634 may be able to determine from the source type associated with the event data that the timestamps can be extracted from the events themselves. In some cases, an event does not include a timestamp and the parsing module 634 determines a timestamp for the event, for example from a name associated with the event data from the data source 602 (e.g., a file name when the event data is in the form of a file) or a time associated with the event data (e.g., a file modification time). As another example, when the parsing module 634 is not able to determine a timestamp from the event data, the parsing module 634 may use the time at which it is indexing the event data. As another example, the parsing module 634 can use a user-configured rule to determine the timestamps to associate with events.

The parsing module 634 can further determine event boundaries. In some cases, a single line (e.g., a sequence of characters ending with a line termination) in event data represents one event while in other cases, a single line represents multiple events. In yet other cases, one event may span multiple lines within the event data. The parsing module 634 may be able to determine event boundaries from the source type associated with the event data, for example from a data structure indicated by the source type. In some implementations, a user can configure rules the parsing module 634 can use to identify event boundaries.

The parsing module 634 can further extract data from events and possibly also perform transformations on the events. For example, the parsing module 634 can extract a set of fields (key-value pairs) for each event, such as a host or hostname, source or source name, and/or source type. The parsing module 634 may extract certain fields by default or based on a user configuration. Alternatively or additionally, the parsing module 634 may add fields to events, such as a source type or a user-configured field. As another example of a transformation, the parsing module 634 can anonymize fields in events to mask sensitive information, such as social security numbers or account numbers. Anonymizing fields can include changing or replacing values of specific fields. The parsing component 634 can further perform user-configured transformations.

The parsing module 634 outputs the results of processing incoming event data to the indexing module 636, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 632 can be configured to identify searchable segments that are parts of fields, searchable segments that are entire fields, or both. The parsing module 634 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 646, to find event data that matches a search query. In some implementations, segmentation can alternatively be performed by the forwarder 626. Segmentation can also be disabled, in which case the indexer 632 will not build a lexicon for the event data. When segmentation is disabled, the search system searches the event data directly.

Building index data structures generates the index 638. The index 638 is a storage data structure on a storage device (e.g., a disk drive or other physical device for storing digital data). The storage device may be a component of the computing device on which the indexer 632 is operating (referred to herein as local storage) or may be a component of a different computing device (referred to herein as remote storage) that the indexer 638 has access to over a network. The indexer 632 can manage more than one index and can manage indexes of different types. For example, the indexer 632 can manage event indexes, which impose minimal structure on stored data and can accommodate any type of data. As another example, the indexer 632 can manage metrics indexes, which use a highly structured format to handle the higher volume and lower latency demands associated with metrics data.

The indexing module 636 organizes files in the index 638 in directories referred to as buckets. The files in a bucket 644 can include raw data files, index files, and possibly also other metadata files. As used herein, "raw data" means data as when the data was produced by the data source 602, without alteration to the format or content. As noted previously, the parsing component 634 may add fields to event data and/or perform transformations on fields in the event data. Event data that has been altered in this way is referred to herein as enriched data. A raw data file 648 can include enriched data, in addition to or instead of raw data. The raw data file 648 may be compressed to reduce disk usage. An index file 646, which may also be referred to herein as a "time-series index" or tsidx file, contains metadata that the indexer 632 can use to search a corresponding raw data file 648. As noted above, the metadata in the index file 646 includes a lexicon of the event data, which associates each unique keyword in the event data with a reference to the location of event data within the raw data file 648. The keyword data in the index file 646 may also be referred to as an inverted index. In various implementations, the data intake and query system can use index files for other purposes, such as to store data summarizations that can be used to accelerate searches.

A bucket 644 includes event data for a particular range of time. The indexing module 636 arranges buckets in the index 638 according to the age of the buckets, such that buckets for more recent ranges of time are stored in short-term storage 640 and buckets for less recent ranges of time are stored in long-term storage 642. Short-term storage 640 may be faster to access while long-term storage 642 may be slower to access. Buckets may be moves from short-term storage 640 to long-term storage 642 according to a configurable data retention policy, which can indicate at what point in time a bucket is old enough to be moved.

A bucket's location in short-term storage 640 or long-term storage 642 can also be indicated by the bucket's status. As an example, a bucket's status can be "hot," "warm," "cold," "frozen," or "thawed." In this example, hot bucket is one to which the indexer 632 is writing data and the bucket becomes a warm bucket when the index 632 stops writing data to it. In this example, both hot and warm buckets reside in short-term storage 640. Continuing this example, when a warm bucket is moved to long-term storage 642, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 620 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 620 through the monitoring console 616 provided by the user interface system 614. Using the monitoring console 616, the user can configure and monitor an index cluster, and see information such as disk usage by an index, volume usage by an indexer, index and volume size over time, data age, statistics for bucket types, and bucket settings, among other information.

Figure 7:
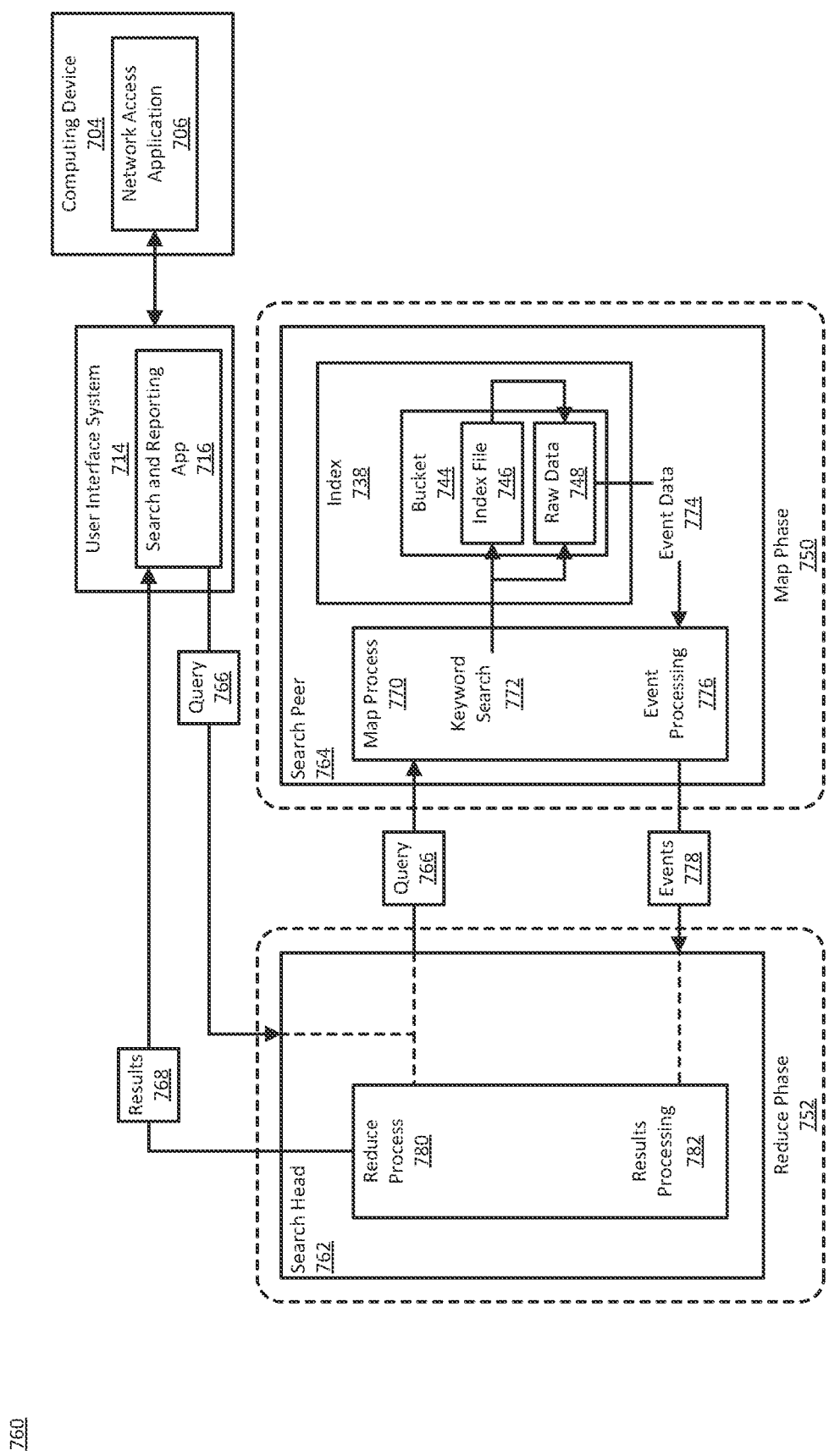
FIG. 7 is a block diagram illustrating in greater detail an example of the search system of a data intake and query system.

FIG. 7 is a block diagram illustrating in greater detail an example of the search system 760 of a data intake and query system, such as the data intake and query system 510 of FIG. 5. The search system 760 of FIG. 7 issues a query 766 to a search head 762, which sends the query 766 to a search peer 764. Using a map process 770, the search peer 764 searches the appropriate index 738 for events identified by the query 766 and sends events 778 so identified back to the search head 762. Using a reduce process 782, the search head 762 processes the events 778 and produces results 768 to respond to the query 766. The results 768 can provide useful insights about the data stored in the index 738. These insights can aid in the administration of information technology systems, in security analysis of information technology systems, and/or in analysis of the development environment provided by information technology systems.

The query 766 that initiates a search is produced by a search and reporting app 716 that is available through the user interface system 714 of the data intake and query system. Using a network access application 706 executing on a computing device 704, a user can input the query 766 into a search field provided by the search and reporting app 716. Alternatively or additionally, the search and reporting app 716 can include pre-configured queries or stored queries that can be activated by the user. In some cases, the search and reporting app 716 initiates the query 766 when the user enters the query 766. In these cases, the query 766 maybe referred to as an "ad-hoc" query. In some cases, the search and reporting app 716 initiates the query 766 based on a schedule. For example, the search and reporting app 716 can be configured to execute the query 766 once per hour, once per day, at a specific time, on a specific date, or at some other time that can be specified by a date, time, and/or frequency. These types of queries maybe referred to as scheduled queries.

The query 766 is specified using a search processing language. The search processing language includes commands or search terms that the search peer 764 will use to identify events to return in the search results 768. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 766 to include sequential commands, where a subsequent command may operate on the results of a prior command. As an example, sequential commands may be separated in the query 766 by a vertical line ("I" or "pipe") symbol.

In addition to one or more search commands, the query 766 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 766 occurs in two broad phases: a map phase 750 and a reduce phase 752. The map phase 750 takes place across one or more search peers. In the map phase 750, the search peers locate event data that matches the search terms in the search query 766 and sorts the event data into field-value pairs. When the map phase 750 is complete, the search peers send events that they have found to one or more search heads for the reduce phase 752. During the reduce phase 752, the search heads process the events through commands in the search query 766 and aggregate the events to produce the final search results 768.

A search head, such as the search head 762 illustrated in FIG. 7, is a component of the search system 760 that manages searches. The search head 762, which may also be referred to herein as a search management component, can be implemented using program code that can be executed on a computing device. The program code for the search head 762 can be stored on a non-transitory computer-readable medium and from this medium can be loaded or copied to the memory of a computing device. One or more hardware processors of the computing device can read the program code from the memory and execute the program code in order to implement the operations of the search head 762.

Upon receiving the search query 766, the search head 762 directs the query 766 to one or more search peers, such as the search peer 764 illustrated in FIG. 7. "Search peer" is an alternate name for "indexer" and a search peer may be largely similar to the indexer described previously. The search peer 764 may be referred to as a "peer node" when the search peer 764 is part of an indexer cluster. The search peer 764, which may also be referred to as a search execution component, can be implemented using program code that can be executed on a computing device. In some implementations, one set of program code implements both the search head 762 and the search peer 764 such that the search head 762 and the search peer 764 form one component. In some implementations, the search head 762 is an independent piece of code that performs searching and no indexing functionality. In these implementations, the search head 762 may be referred to as a dedicated search head.

The search head 762 may consider multiple criteria when determining whether to send the query 766 to the particular search peer 764. For example, the search system 760 may be configured to include multiple search peers that each have duplicative copies of at least some of the event data and are implanted using different hardware resources q. In this example, the sending the search query 766 to more than one search peer allows the search system 760 to distribute the search workload across different hardware resources. As another example, search system 760 may include different search peers for different purposes (e.g., one has an index storing a first type of data or from a first data source while a second has an index storing a second type of data or from a second data source). In this example, the search query 766 may specify which indexes to search, and the search head 762 will send the query 766 to the search peers that have those indexes.

To identify events 778 to send back to the search head 762, the search peer 764 performs a map process 770 to obtain event data 774 from the index 738 that is maintained by the search peer 764. During a first phase of the map process 770, the search peer 764 identifies buckets that have events that are described by the time indicator in the search query 766. As noted above, a bucket contains events whose timestamps fall within a particular range of time. For each bucket 744 whose events can be described by the time indicator, during a second phase of the map process 770, the search peer 764 performs a keyword search 774 using search terms specified in the search query #A66. The search terms can be one or more of keywords, phrases, fields, Boolean expressions, and/or comparison expressions that in combination describe events being searched for. When segmentation is enabled at index time, the search peer 764 performs the keyword search 772 on the bucket's index file 746. As noted previously, the index file 746 includes a lexicon of the searchable terms in the events stored in the bucket's raw data 748 file. The keyword search 772 searches the lexicon for searchable terms that correspond to one or more of the search terms in the query 766. As also noted above, the lexicon incudes, for each searchable term, a reference to each location in the raw data 748 file where the searchable term can be found. Thus, when the keyword search identifies a searchable term in the index file 746 that matches a search term in the query 766, the search peer 764 can use the location references to extract from the raw data 748 file the event data 774 for each event that include the searchable term.

In cases where segmentation was disabled at index time, the search peer 764 performs the keyword search 772 directly on the raw data 748 file. To search the raw data 748, the search peer 764 may identify searchable segments in events in a similar manner as when the data was indexed. Thus, depending on how the search peer 764 is configured, the search peer 764 may look at event fields and/or parts of event fields to determine whether an event matches the query 766. Any matching events can be added to the event data 774 read from the raw data 748 file. The search peer 764 can further be configured to enable segmentation at search time, so that searching of the index 738 causes the search peer 764 to build a lexicon in the index file 746.

The event data 774 obtained from the raw data 748 file includes the full text of each event found by the keyword search 772. During a third phase of the map process 770, the search peer 764 performs event processing 776 on the event data 774, with the steps performed being determined by the configuration of the search peer 764 and/or commands in the search query 766. For example, the search peer 764 can be configured to perform field discovery and field extraction. Field discovery is a process by which the search peer 764 identifies and extracts key-value pairs from the events in the event data 774. The search peer 764 can, for example, be configured to automatically extract the first 100 fields (or another number of fields) in the event data 774 that can be identified as key-value pairs. As another example, the search peer 764 can extract any fields explicitly mentioned in the search query 766. The search peer 764 can, alternatively or additionally, be configured with particular field extractions to perform.

Other examples of steps that can be performed during event processing 776 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 764 sends processed events 778 to the search head 762, which performs a reduce process 780. The reduce process 780 potentially receives events from multiple search peers and performs various results processing 782 steps on the received events. The results processing 782 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 782 can further include applying commands from the search query 766 to the events. The query 766 can include, for example, commands for evaluating and/or manipulating fields (e.g., to generate new fields from existing fields or parse fields that have more than one value). As another example, the query 766 can include commands for calculating statistics over the events, such as counts of the occurrences of fields, or sums, averages, ranges, and so on, of field values. As another example, the query 766 can include commands for generating statistical values for purposes of generating charts of graphs of the events.

The reduce process 780 outputs the events found by the search query 766, as well as information about the events. The search head 762 transmits the events and the information about the events as search results 768, which are received by the search and reporting app 716. The search and reporting app 716 can generate visual interfaces for viewing the search results 768. The search and reporting app 716 can, for example, output visual interfaces for the network access application 706 running on a computing device 704 to generate.

The visual interfaces can include various visualizations of the search results 768, such as tables, line or area charts, Chloropleth maps, or single values. The search and reporting app 716 can organize the visualizations into a dashboard, where the dashboard includes a panel for each visualization. A dashboard can thus include, for example, a panel listing the raw event data for the events in the search results 768, a panel listing fields extracted at index time and/or found through field discovery along with statistics for those fields, and/or a timeline chart indicating how many events occurred at specific points in time (as indicated by the timestamps associated with each event). In various implementations, the search and reporting app 716 can provide one or more default dashboards. Alternatively or additionally, the search and reporting app 716 can include functionality that enables a user to configure custom dashboards.

The search and reporting app 716 can also enable further investigation into the events in the search results 716. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 766. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

FIG. 8 illustrates an example of a self-managed network 800 that includes a data intake and query system. "Self-managed" in this instance means that the entity that is operating the self-managed network 800 configures, administers, maintains, and/or operates the data intake and query system using its own compute resources and people. Further, the self-managed network 800 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 800 is located within the customer's on-prem environment, such as in the entity's data center, the operation and management of the self-managed network 800, including of the resources in the self-managed network 800, is under the control of the entity. For example, administrative personnel of the entity have complete access to and control over the configuration, management, and security of the self-managed network 800 and its resources.

The self-managed network 800 can execute one or more instances of the data intake and query system. An instance of the data intake and query system may be executed by one or more computing devices that are part of the self-managed network 800. A data intake and query system instance can comprise an indexing system and a search system, where the indexing system includes one or more indexers 820 and the search system includes one or more search heads 860.

As depicted in FIG. 8, the self-managed network 800 can include one or more data sources 802. Data received from these data sources may be processed by an instance of the data intake and query system within self-managed network 800. The data sources 802 and the data intake and query system instance can be communicatively coupled to each other via a private network 810.

Users associated with the entity can interact with and avail themselves of the functions performed by a data intake and query system instance using computing devices. As depicted in FIG. 8, a computing device 804 can execute a network access application 806 (e.g., a web browser), that can communicate with the data intake and query system instance and with data sources 802 via the private network 810. Using the computing device 804, a user can perform various operations with respect to the data intake and query system, such as management and administration of the data intake and query system, generation of knowledge objects, and other functions. Results generated from processing performed by the data intake and query system instance may be communicated to the computing device 804 and output to the user via an output system (e.g., a screen) of the computing device 804.

The self-managed network 800 can also be connected to other networks that are outside the entity's on-premise environment/network, such as networks outside the entity's data center. Connectivity to these other external networks is controlled and regulated through one or more layers of security provided by the self-managed network 800. One or more of these security layers can be implemented using firewalls 812. The firewalls 812 form a layer of security around the self-managed network 800 and regulate the transmission of traffic from the self-managed network 800 to the other networks and from these other networks to the self-managed network 800.

Networks external to the self-managed network can include various types of networks including public networks 890, other private networks, and/or cloud networks provided by one or more cloud service providers. An example of a public network 890 is the Internet. In the example depicted in FIG. 8, the self-managed network 800 is connected to a service provider network 892 provided by a cloud service provider via the public network 890.

In some implementations, resources provided by a cloud service provider may be used to facilitate the configuration and management of resources within the self-managed network 800. For example, configuration and management of a data intake and query system instance in the self-managed network 800 may be facilitated by a software management system 894 operating in the service provider network 892. There are various ways in which the software management system 894 can facilitate the configuration and management of a data intake and query system instance within the self-managed network 800. As one example, the software management system 894 may facilitate the download of software including software updates for the data intake and query system. In this example, the software management system 894 may store information indicative of the versions of the various data intake and query system instances present in the self-managed network 800. When a software patch or upgrade is available for an instance, the software management system 894 may inform the self-managed network 800 of the patch or upgrade. This can be done via messages communicated from the software management system 894 to the self-managed network 800.

The software management system 894 may also provide simplified ways for the patches and/or upgrades to be downloaded and applied to the self-managed network 800. For example, a message communicated from the software management system 894 to the self-managed network 800 regarding a software upgrade may include a Uniform Resource Identifier (URI) that can be used by a system administrator of the self-managed network 800 to download the upgrade to the self-managed network 800. In this manner, management resources provided by a cloud service provider using the service provider network 892 and which are located outside the self-managed network 800 can be used to facilitate the configuration and management of one or more resources within the entity's on-prem environment. In some implementations, the download of the upgrades and patches may be automated, whereby the software management system 894 is authorized to, upon determining that a patch is applicable to a data intake and query system instance inside the self-managed network 800, automatically communicate the upgrade or patch to self-managed network 800 and cause it to be installed within self-managed network 800.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A method implemented by execution of computer-executable code at a query conversion system comprising a processor, the method comprising:
   receiving, by the query conversion system, a first query string in a first query language;
   generating, by the query conversion system, a first node tree logically representing the first query string, wherein individual nodes of the first node tree correspond to individual commands, in the first query language, specified within the first query string;
   generating, by the query conversion system, a second node tree corresponding to a second query language, wherein generating the second node tree comprises determining a conversion of the individual nodes of the first node tree, wherein conversion of each individual node in the first node tree results in a corresponding node in the second node tree that represents:
      (i) when functionality equivalent to the command of the individual node in the first node tree is implemented via a native command or operation of the second query language, the native command or operation of the second query language as a converted node; and
      (ii) when functionality equivalent to the command of the individual node in the first node tree is not natively implemented via a command in the second query language or by a function defined within a compatibility library, the command of the individual node in the first node tree as a non-converted node;
   generating, by the query conversion system, a second query string in the second query language utilizing the second node tree, wherein the second query string comprises at least one native command or operation of the second query language corresponding to a converted node and at least one command in the first query language corresponding to a non-converted node;
   executing the second query string to generate search results; and
   transmitting the search results over a network to a client computing device for display.

2. The method of claim 1, wherein at least one corresponding node in the second node tree is annotated to note that the at least one corresponding node in the second node tree represents a command in the first query language.

3. The method of claim 1, wherein the compatibility library is a package associated with the second query language.

4. The method of claim 1, wherein a given native command or operation of the second query language implements functionality equivalent to a command of a given node in the first node tree only if all options of the command of the given node in the first node tree are supported in the given native command or operation of the second query language.

5. The method of claim 1, wherein a function defined within the compatibility library implements functionality equivalent to a command of a given node in the first node tree only if all options of the command of the given node in the first node tree are supported in the function defined within the compatibility library.

6. The method of claim 1, wherein generating the second node tree comprises parsing and tokenizing the first node tree.

7. The method of claim 1, wherein one or more functions defined within the compatibility library with functionality equivalent to a command of an individual node of the first node tree are identified by reference to a mapping table.

8. The method of claim 1, wherein a command of a given node in the first node tree is determined to be functionally equivalent to a given native command or operation of the second query language by reference to a mapping table.

9. The method of claim 1, wherein a command of a given node in the first node tree is converted to a function defined within the compatibility library, only if all options of the command of the given node in the first node tree are not supported in any native commands or operations of the second query language.

10. A system comprising:
    a processor; and
    a non-transitory computer-readable medium having stored thereon instructions that, when executed by the processor, cause the processor to:
       receive, by a query conversion system, a first query string in a first query language;
       generate, by the query conversion system, a first node tree logically representing the first query string, wherein individual nodes of the first node tree correspond to individual commands, in the first query language, specified within the first query string;
       generate, by the query conversion system, a second node tree corresponding to a second query language, wherein generating the second node tree comprises determining a conversion of the individual nodes of the first node tree, wherein conversion of each individual node in the first node tree results in a corresponding node in the second node tree that represents:
          (i) when functionality equivalent to the command of the individual node in the first node tree is implemented via a native command or operation of the second query language, the native command or operation of the second query language as a converted node; and
          (ii) when functionality equivalent to the command of the individual node in the first node tree is not natively implemented via a command in the second query language or by a function defined within a compatibility library, the command of the individual node in the first node tree as a non-converted node;
       generate, by the query conversion system, a second query string in the second query language utilizing the second node tree, wherein the second query string comprises at least one native command or operation of the second query language corresponding to a converted node and at least one command in the first query language corresponding to a non-converted node;
       execute the second query string to generate search results; and
       transmit the search results over a network to a client computing device for display.

11. The system of claim 10, wherein at least one corresponding node in the second node tree is annotated to note that the at least one corresponding node in the second node tree represents a command in the first query language.

12. The system of claim 10, wherein the compatibility library is a package associated with the second query language.

13. The system of claim 10, wherein a given native command or operation of the second query language implements functionality equivalent to a command of a given node in the first node tree only if all options of the command of the given node in the first node tree are supported in the given native command or operation of the second query language.

14. The system of claim 10, wherein a function defined within the compatibility library implements functionality equivalent to a command of a given node in the first node tree only if all options of the command of the given node in the first node tree are supported in the function defined within the compatibility library.

15. The system of claim 10, wherein to generate the second node tree, the instructions further cause the processor to parse and tokenize the first node tree.

16. The system of claim 10, wherein one or more functions defined within the compatibility library with functionality equivalent to a command of an individual node of the first node tree are identified by reference to a mapping table.

17. The system of claim 10, wherein a command of a given node in the first node tree is determined to be functionally equivalent to a given native command or operation of the second query language by reference to a mapping table.

18. The system of claim 10, wherein a command of a given node in the first node tree is converted to a function defined within the compatibility library, only if all options of the command of the given node in the first node tree are not supported in any native commands or operations of the second query language.

19. One or more non-transitory computer-readable media having stored thereon instructions that, when executed by a computing system including one or more processors, cause the computing system to:
   receive, by a query conversion system, a first query string in a first query language;
   generate, by the query conversion system, a first node tree logically representing the first query string, wherein individual nodes of the first node tree correspond to individual commands, in the first query language, specified within the first query string;
   generate, by the query conversion system, a second node tree corresponding to a second query language, wherein generating the second node tree comprises determining a conversion of the individual nodes of the first node tree, wherein conversion of each individual node in the first node tree results in a corresponding node in the second node tree that represents:
   (i) when functionality equivalent to the command of the individual node in the first node tree is implemented via a native command or operation of the second query language, the native command or operation of the second query language as a converted node; and
   (ii) when functionality equivalent to the command of the individual node in the first node tree is not natively implemented via a command in the second query language or by a function defined within a compatibility library, the command of the individual node in the first node tree as a non-converted node;
   generate, by the query conversion system, a second query string in the second query language utilizing the second node tree, wherein the second query string comprises at least one native command or operation of the second query language corresponding to a converted node and at least one command in the first query language corresponding to a non-converted node;
   execute the second query string to generate search results; and
   transmit the search results over a network to a client computing device for display.

20. The one or more non-transitory computer-readable media of claim 19, wherein the compatibility library is a package associated with the second query language.

* * * * *